(12) United States Patent
Milne et al.

(10) Patent No.: US 12,306,365 B2
(45) Date of Patent: May 20, 2025

(54) WIRELINE OPTICAL FIBER SENSING

(71) Applicant: Silixa Ltd., Elstree (GB)

(72) Inventors: Craig Milne, Elstree (GB); Pete Richter, Elstree (GB); Glynn Williams, Elstree (GB); Craig Woerpel, Elstree (GB)

(73) Assignee: Silixa Ltd., Elstree (GB)

( * ) Notice: Subject to any disclaimer, the term of this patent is extended or adjusted under 35 U.S.C. 154(b) by 238 days.

(21) Appl. No.: 17/988,290

(22) Filed: Nov. 16, 2022

(65) Prior Publication Data

US 2023/0072270 A1    Mar. 9, 2023

Related U.S. Application Data

(63) Continuation of application No. 16/553,279, filed on Aug. 28, 2019, now abandoned.

(60) Provisional application No. 62/724,484, filed on Aug. 29, 2018.

(51) Int. Cl.
*G01V 1/22*    (2006.01)
*G01D 5/353*    (2006.01)
*G01V 1/52*    (2006.01)

(52) U.S. Cl.
CPC ......... *G01V 1/226* (2013.01); *G01D 5/35358* (2013.01); *G01V 1/52* (2013.01)

(58) Field of Classification Search
CPC ...................................... G01V 1/226
USPC ...................................... 73/152.16
See application file for complete search history.

(56) References Cited

U.S. PATENT DOCUMENTS

| | | | |
|---|---|---|---|
| 8,605,542 B2* | 12/2013 | Coates ............... | G01H 9/004 367/25 |
| 9,798,023 B2* | 10/2017 | Vigneaux ............ | G01V 1/42 |
| 10,458,228 B2* | 10/2019 | Jin ..................... | E21B 43/26 |
| 10,495,779 B2* | 12/2019 | LeBlanc ............. | G06Q 50/02 |
| 11,047,230 B2* | 6/2021 | Ellmauthaler ...... | E21B 49/00 |
| 11,237,025 B2* | 2/2022 | Issa ................... | G01H 9/004 |
| 11,946,365 B2* | 4/2024 | Wilson .............. | H04J 14/02 |
| 2008/0236867 A1 | 10/2008 | Varkey et al. | |
| 2011/0292763 A1 | 12/2011 | Coates et al. | |
| 2014/0376332 A1 | 12/2014 | Vigneaux et al. | |

(Continued)

FOREIGN PATENT DOCUMENTS

| | | | |
|---|---|---|---|
| WO | WO-2010136810 A2 | 12/2010 | |
| WO | WO-2012168679 A1 | 12/2012 | |

(Continued)

*Primary Examiner* — John Fitzgerald
(74) *Attorney, Agent, or Firm* — Honigman LLP; Matthew H. Szalach

(57) ABSTRACT

The high sensitivity provided by an enhanced DAS system comprising a DAS interrogator and a high reflectivity fiber allows for the deployment of such a high reflectivity fiber as part of a wireline intervention cable which can be temporarily lowered into a well, thus avoiding the need to permanently cement such a high reflectivity optical fiber cable into the well. Instead, such a wireline cable incorporating the high reflectivity optical fiber has been found to be sensitive enough to detect micro-seismic activity and low frequency strain with many more measurement points and channels than conventional wireline deployed geophones and tiltmeters. Additionally, the cable requires no clamping and can be easily and quickly removed from one well and placed in another well.

18 Claims, 7 Drawing Sheets

(56) References Cited

U.S. PATENT DOCUMENTS

| | | | |
|---|---|---|---|
| 2018/0292569 A1 | 10/2018 | LeBlanc et al. | |
| 2019/0169985 A1* | 6/2019 | Dickenson | G01K 11/32 |
| 2019/0242233 A1* | 8/2019 | Le Calvez | E21B 43/26 |
| 2020/0209020 A1* | 7/2020 | Issa | G01H 9/004 |
| 2020/0233107 A1* | 7/2020 | Constantinou | G01K 11/32 |
| 2021/0033739 A1 | 2/2021 | Jaaskelainen et al. | |
| 2022/0113169 A1* | 4/2022 | Issa | G01B 11/18 |

FOREIGN PATENT DOCUMENTS

| | | |
|---|---|---|
| WO | WO-2016142695 A1 | 9/2016 |
| WO | WO-2017021740 A1 | 2/2017 |

* cited by examiner

WIRELINE OPTICAL FIBER SENSING

CROSS REFERENCE TO RELATED APPLICATIONS

This application is a continuation of U.S. application Ser. No. 16/553,279, filed Aug. 28, 2019, which claims priority under 35 U.S.C. § 119(e) to U.S. Provisional Patent Application Ser. No. 62/724,484, filed Aug. 29, 2018, the disclosures of which are hereby incorporated by reference in their entireties.

TECHNICAL FIELD

The present disclosure relates to distributed optical fiber sensors, and in particular in some embodiments to such sensors which make use of high reflectivity optical fibers, such as optical fibers with many weak reflectors distributed along the length of the sensing portion or optical fibers with higher backscatter coefficients than usual, embedded within a wireline cable deployed downhole as the sensing optical fiber.

BACKGROUND

This section provides background information related to the present disclosure and is not necessarily prior art.

Optical fiber based distributed sensor systems are finding many applications, in particular in the oil and gas industry for flow monitoring and seismic detection, and in the security industry for area or perimeter security monitoring, or monitoring along a long line such as a pipeline or railway line. The present applicant, Silixa Ltd, of Elstree, London, markets two optical fiber distributed sensing systems, the Silixa® iDAS™ system, which is a very sensitive optical fiber distributed acoustic sensor, and the Silixa® Ultima™ system, which is a distributed optical fiber based temperature sensor. Further details of the iDAS™ system are available at the priority date at http://www.silixa.com/technology/idas/, and further details of the Ultima™ system are available at the priority date at http://www.silixa.com/technology/dts/. In addition, the present applicant's earlier International patent application WO 2010/136810 gives further technical details of the operation of its distributed acoustic sensor system, the entire contents of which necessary for understanding the present invention being incorporated herein by reference.

Recently the applicant has found that performance improvements in terms of increased signal to noise ratio (SNR) can be obtained by using optical fiber with weak reflectors embedded therein along its length with a DAS system. In this respect performance improvements of as much as 20 dB have been obtained using such optical fiber. Details of such an optical fiber and its use with the Silixa® iDAS™ system were given in our previous International patent application WO2016/142695, the entire contents of which necessary for understanding the present disclosure being incorporated herein by reference. Therein we describe an improved optical fiber distributed acoustic sensor system that makes use of a specially designed optical fiber to improve overall sensitivity of the system, in some embodiments by a factor in excess of 10. This is achieved by inserting into the fiber weak (by which we mean of low reflectivity) broadband reflectors periodically along the fiber. The reflectors reflect only a small proportion of the light from the DAS incident thereon back along the fiber, typically in the region of 0.001% to 0.1%, but preferably around 0.01% reflectivity per reflector. In addition, to allow for temperature compensation, the reflection bandwidth is relatively broadband i.e. equal or greater than the region of +/−2 nm, preferably as large as +/−5 nm from the nominal laser wavelength. This provides for temperature dependent reflectivity of the reflectors to be accommodated, particularly where the reflectors are formed from gratings, that are known to often exhibit temperature dependence of the reflected wavelength over a broad e.g. +/−2 nm bandwidth. In some embodiments the reflectors are formed from a series of fiber Bragg gratings, each with a different center reflecting frequency, the reflecting frequencies and bandwidths of the gratings being selected to provide the broadband reflection. In other embodiments a chirped grating may also be used to provide the same effect. In other embodiments a short grating with low reflectivity and broad bandwidth may be written into the sensing fiber using femtosecond laser writing process. In some embodiments, the reflectors are spaced at the gauge length i.e. the desired spatial resolution of the optical fiber DAS, in other embodiments the reflectors are spaced at a distance calculated in dependence on the gauge length, for example as a fraction or multiple thereof.

One use of Silixa's optical fiber DAS technology, including optical fiber with weak reflectors as described above, has been to monitor hydraulic fracturing in long horizontal wells. The use of hydraulic fracturing in multi-stage long horizontal wells has been applied successfully to unconventional reservoirs. It has been customary on certain high value "science" projects, or when drilling a new well pad, to acquire fiber optic distributed acoustic sensing data (DAS) to both allocate the placement of fluids and proppant to the fractured stages and record the resulting micro-seismic and low frequency strain response and make repeat vertical seismic profiles (VSP) to optimize the well spacing and completion design. Typically, this has been achieved by cementing a permanent fiber optic cable outside casing on one or more wells and recording DAS data during stimulation. Cementing the fiber optic cable provides direct coupling between the cable and the formation which enables sufficient acoustic coupling to record the resulting micro-seismic and low frequency strain response. Permanent installations are both high risk due to the potential for cable breakage and increase well costs due to the cost of a one-time cable and the additional rig time taken to prepare the hole.

Because of the previous perceived need to permanently install an optical fiber cable for DAS use by cementing the cable into the well, where temporary measurements are required conventional wireline sensing tools are still often used. For micro-seismic and strain measurements such tools have often been either borehole geophones or tilt-meters that are deployed on conventional wireline. They are bulky components with limited channels such that only a limited number of recorders can be placed in the well and borehole geophones are unable to measure low frequency strain (<1 Hz). Wireline technology has been used for many years, and involves deploying sensors or other tools at points along a (typically braided) conductive line, which supplies power and communications functions to the tools and sensors. Multiple individual control and power lines can be bundled together in a single wireline cable, and it is also known to include optical fibers within the cable for communications and downhole tool control purposes.

SUMMARY

This section provides a general summary of the disclosure, and is not a comprehensive disclosure of its full scope or all of its features.

In embodiments of the present disclosure the inventors have found that the high sensitivity provided by the DAS system and in particular the enhanced DAS system comprising a DAS interrogator and a high reflectivity fiber as described in our previous application WO2016/142695 allows for the deployment of such a high reflectivity fiber as part of a wireline intervention cable which can be temporarily lowered into a well, thus avoiding the need to permanently cement such a high reflectivity optical fiber cable into the well, as has been done previously. Instead, such a wireline cable incorporating the high reflectivity optical fiber has been found to be sensitive enough to detect micro-seismic activity and low frequency strain with many more measurement points and channels than conventional wireline deployed geophones and tilt-meters. Additionally, the cable requires no clamping and can be easily and quickly removed from one well and placed in another.

In addition to the cable being used for monitoring microseismic, low frequency strain events and vertical seismic profiles, in another use it could be deployed into a drilled but uncompleted well whilst an adjacent well is being drilled and detect the variation in drilling induced vibrations that relate to differences in stress and brittleness of the formation along the long lateral section.

In one embodiment, the cable incorporating the high reflectivity fiber has sufficient mass such that it is not buoyant in the presence of liquids and lies against the bottom of steel casing that is cemented in a lateral oil or gas well.

Because the optical fiber with high reflectivity can be incorporated into conventional wireline cable very easily, conventional wireline deployment techniques can be used to deploy the cable downhole, including the cable being pumped or tractored into position in a lateral section of an oil or gas well.

Embodiments of the invention provide an optical fiber distributed sensor system, comprising: an optical source arranged in use to produce optical signal pulses; an optical fiber deployable in use in an environment to be sensed and arranged in use to receive the optical signal pulses; and sensing apparatus arranged in use to detect light from the optical signal pulses reflected back along the optical fiber and to determine any one or more of an acoustic, vibration, temperature or other parameter that perturbs the path length of the optical fiber in dependence on the reflected light; the system being characterized in that the optical fiber is encased in a wireline cable for deployment downhole.

Another embodiment provides a wireline cable having encased therein an optical fiber adapted so as to reflect or backscatter any optical pulses travelling there-along to a greater extent than conventional optical fiber.

Another embodiment provides a wireline cable having encased therein an optical fiber adapted so as to reflect or backscatter any optical pulses travelling there-along to a greater extent than conventional optical fiber, In one such arrangement the cable may be deployed into the well in a "U" configuration, such that the cable extends to the bottom of the well, and then doubles back to return back up the well. With such a U-shaped deployment the cable can be arranged such that the outward leg of fiber in the cable has no reflectors therein (i.e. it is not high reflectivity cable), but then the return leg is formed from high reflectivity fiber, where the regions of improved backscatter or reflectivity are positioned in the far end of the leading fiber and may be then continued to the top of the return fiber. In one case, the laser light is launched down the fiber leg with no reflectors, such that the first reflector encountered is at the bottom of the well. This ensures a good crosstalk behaviour as the region of interest at the bottom of the well is positioned first in the optical path, and so encounters minimal crosstalk. Also the loud section, at the top of the well, is positioned at the end of the optical fiber and so does not contribute crosstalk to the majority of the optical path, including the particular region of interest.

A yet further embodiment of the invention provides method of downhole acoustic surveying, comprising: deploying a wireline cable containing an optical fiber downhole into a well; connecting the surface end of the optical fiber to a distributed acoustic sensor interrogator; operating the interrogator to send optical pulses along the optical fiber and measuring the optical reflections and/or backscatter received from along the length of the optical fiber; after the interrogator operation, disconnecting the surface end of the optical fiber from the interrogator and retrieving the wireline cable from within the well.

Another embodiment of the invention provides processing the determined properties of any acquired acoustic signals, using standard known geophysical data processing techniques, to determine properties of any microseismic, low frequency strain and/or drilling induced vibrations present in the vicinity of the well.

Another embodiment of the invention provides processing the determined properties of any acquired acoustic and temperature signals to monitor the production profile of a well. This would involve using standard known array processing, noise logging and thermal analysis techniques, alongside advanced acoustic processing to determine the speed of sound in the production fluid at different depths. This information indicates in-situ fluid type and the Doppler shift between the speed of sound modes travelling up and down in the well, and makes it possible to measure the fluid flow velocity and hence flow rates. Advanced acoustic processing techniques such as these are further described in WO2010/136810 and WO2017/021740, which are incorporated herein by reference.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected configurations and not all possible implementations, and are not intended to limit the scope of the present disclosure. Like reference numerals refer to like parts.

DETAILED DESCRIPTION

Figure 1:
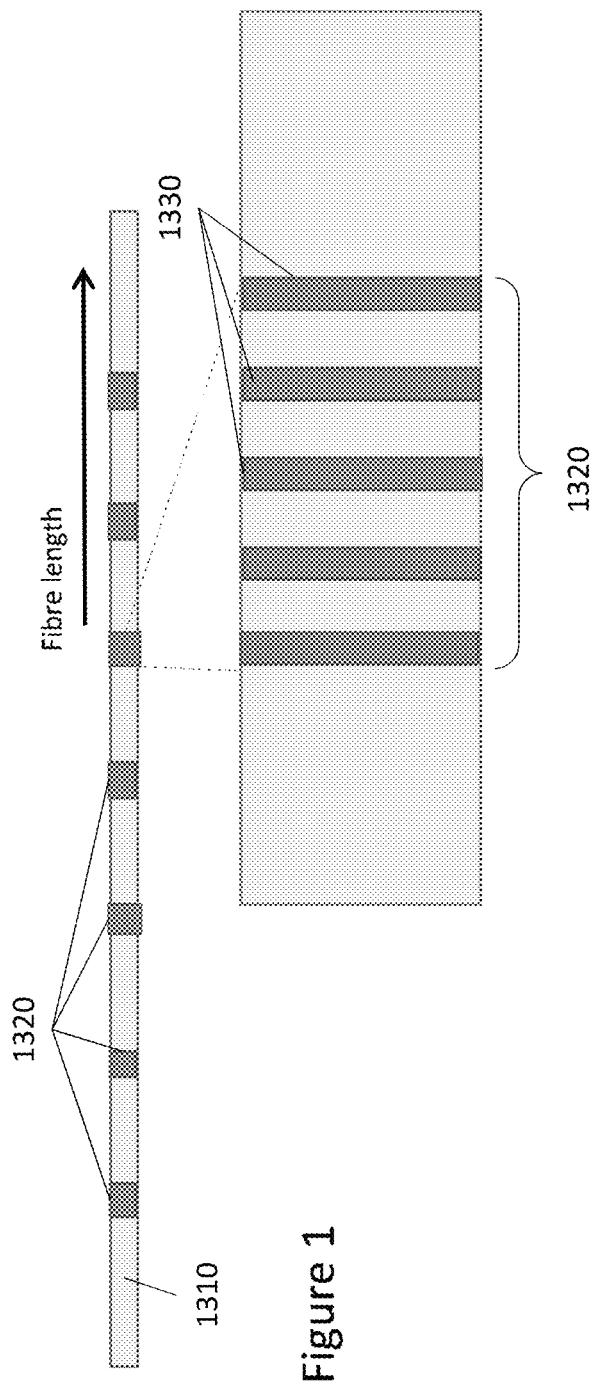
FIG. 1 is a block diagram of an optical fiber provided with reflector portions in a sensing region thereof.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Overview of Embodiments

Embodiments of the invention provide an optical fiber distributed sensor, and in some embodiments an optical fiber distributed acoustic sensor that improves on the Silixa® iDAS™ system described in WO2016/142695 (the entire contents of which necessary for understanding the invention being incorporated herein by reference) by deploying the system in a wireline arrangement for temporary deployment downhole. In particular, a wireline cable is provided that incorporates a high reflectivity optical fiber, and in particular an optical fiber having weak reflectors embedded therein, as described in WO 2016/142695. In alternative embodiments, however different high reflectivity fiber may be used which is specially designed to have a high backscatter coefficient; such fibers are commercially available from companies such as Corning Inc. Embodiments of the invention are therefore not limited to the weak reflector fiber described in WO2016/142695, and fiber that provides higher backscatter than usual can also be used.

In further embodiments it has also been observed that using the DAS system described in WO2016/142695, and also in our earlier application WO2010/136810, with conventional fiber (which may be single mode or multimode, and which need not have any increased reflection or backscatter characteristics), embedded within a wireline cable has permitted wellbore surveying including cross-well strain and microseismic surveying. Therefore, in other embodiments of the invention a high reflectivity cable need not always be used, and good results may in some circumstances be obtained from existing conventional optical fiber cables that may already be provided in a wireline for some other reason, e.g. downhole communications or downhole tool control.

The wireline cable is deployed downhole in a conventional manner, but is arranged so as to be heavy enough, for example by the provision of acoustically conducting armor surrounding the wire, that when it lies in a horizontal section of well it lies under the force of gravity against the bottom of the well casing or tubing (if installed), and hence is acoustically connected by the well casing to the surrounding rock strata. This allows for good acoustic conductivity and hence sensitivity of the DAS system which is connected to the cable. A near-vertical section of a well may also be monitored by the wireline cable provided there is a sufficient deviation (e.g. typically >5 degrees) from the vertical to permit the cable to lie against the well casing or tubing (if installed) under the force of gravity.

Once in place, the DAS system can then detect, via the optical fiber in the wireline cable, microseismic activity and low frequency strain with many more measurement points and channels than conventional wireline deployed geophones and tiltmeters. In addition the DAS system with the wireline cable can be used to conduct vertical seismic profiles.

One of the big advantages of the use of the DAS system with a wireline cable is that once the DAS measurements and surveys have been undertaken, the wireline cable can be removed from the well, and deployed for use in another well later, wherever required. Whilst this is of course an advantage of most wireline tooling, previously this advantage had not been obtained with the specialist high reflectivity optical fiber used to increase the SNR with an optical fiber DAS, as usually the fiber was cemented in place. However, being able to re-use an optical fiber cable provided with the specialist high reflectivity optical fiber will save cost and help to reduce overall the cost of DAS operations, particularly when compared to conventional wireline acoustic surveying tools.

Although reference is made to a wireline cable it should be understood that any means of conveyancing an optical fiber into a wellbore that allows the optical fiber to maintain sufficient acoustic coupling with the wall of the wellbore will also enable the detection of microseismic activity and low frequency strain. Alternative means of conveying a an optical fiber into a well include slickline cable and carbon fiber rods. That is, in other embodiments the optical fiber can be incorporated into a slickline cable for well insertion, or into carbon fiber rods for well insertion.

Detailed Description of an Embodiment

Figure 2:
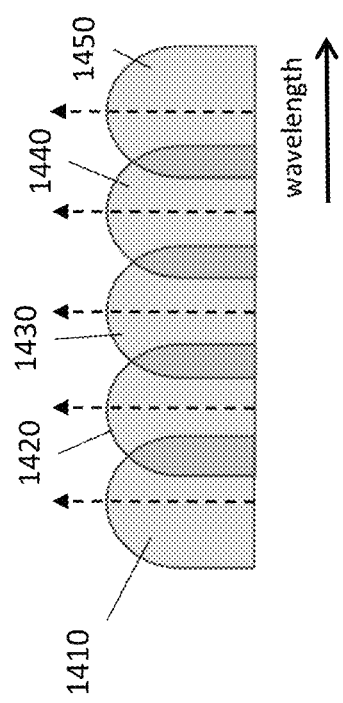
FIG. 2 is a diagram illustrating the broadband reflectance of the reflector portions.

FIG. 1 shows an example optical fiber for use with an optical fiber distributed sensing system, such as is already known in the art from WO2016/142695. Here, an optical fiber 1310 is provided with a plurality of reflector portions 1320 distributed along its length, with each reflector portion formed from a series of Fiber Bragg Gratings 1330, being gratings written into the fiber as it is manufactured. As shown in FIG. 2, each grating has a slightly different center reflectance wavelength, with the reflectance bandwidths of the individual gratings overlapping to provide a broadband reflector in total. The reflectance of each grating is relatively weak, such that thousands of reflectors may be placed along the fiber, ensuring that the sensor still has significant range.

Figure 3:
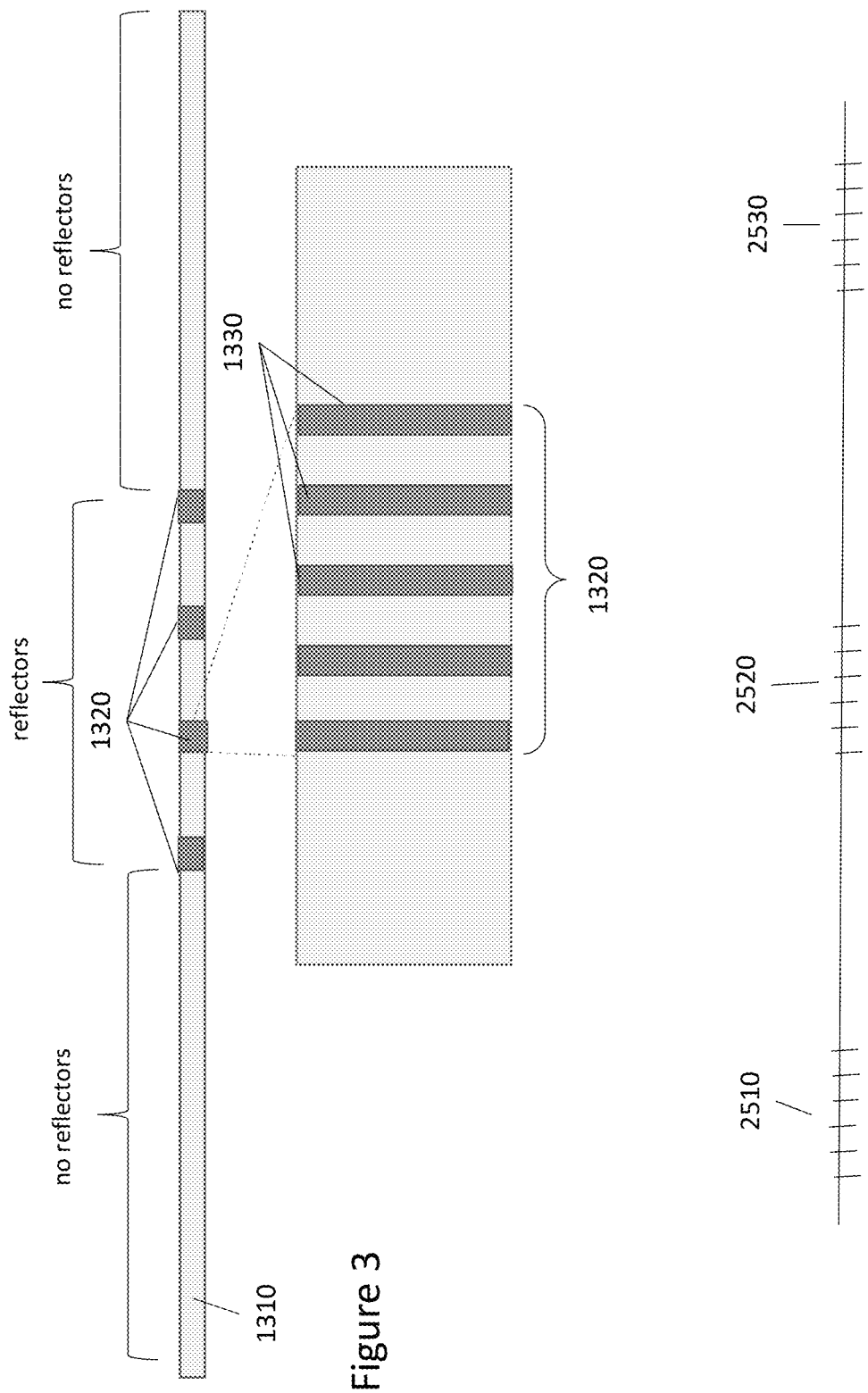
FIG. 3 is a diagram with further details of the reflector portions in the optical fiber.

FIG. 3 illustrates a variant on the base arrangement shown in FIGS. 1 and 2. Here three sensing portions 2510, 2520, and 2530 of fiber are provided, each provided with plural reflectors 1320. The sensing portions of fiber are dispersed at different longitudinal positions along the whole fiber, and are connected by transmission portions of fiber within which no reflectors are provided, and hence which are relatively low loss for carrying the optical pulses from sensing portion to sensing portion. In the arrangement of FIG. 25, however, each sensing portion 2510, 2520, and 2530 may have reflectors that reflect the same wavelengths of light, or alternatively may have reflectors that reflect different, substantially non-overlapping, wavelengths of light. That is, the reflectors in the first sensing portion 2510 may reflect light around a μm, those of the second sensing portion 2520 reflect light around b μm, and those of the third sensing portion 2530 reflect light around c μm. At wavelengths that the reflectors don't reflect the incident light is transmitted by the reflectors with substantially no additional loss.

With such an arrangement where the different reflectors reflect different wavelengths of light the optical fiber distributed sensor system is able to provide spatial selectivity in terms of which set of reflectors at which spatial location it wants to receive reflections from (and thereby enable sensing at that location), by varying the wavelengths of the transmitted pulses to match the reflector wavelengths of the set of reflectors that are to be selected. Hence, varying the wavelengths provides the spatial selectivity of where the sensing system will sense, specifically which set of reflectors will provide reflections from which sensing can then be undertaken.

Additionally, because the non-selected reflectors do not reflect substantially at the wavelengths of the pulses being transmitted along the fiber for the selected set of reflectors, losses from unwanted reflections are kept to a minimum, and the sensor range is increased.

Moreover, and more generally, by not having reflectors all along the fiber the system can be selective as to where it senses, and only provide reflectors in those regions where sensing is required. In the present embodiment, as described next, that may be in those sections of fiber that lie in the horizontal section of well in the production zone. With such techniques the effective range of the sensor can be increased.

Figure 5:
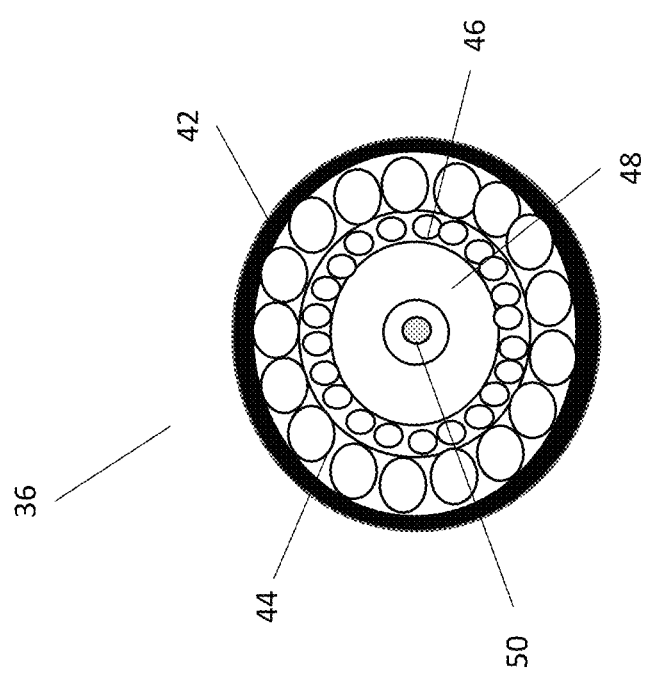
FIG. 5 is an example cross-section of a wireline cable incorporating a high reflectivity optical fiber such as those shown in FIG. 1 or 3.

The fiber of FIG. 1 or 3 is incorporated within a wireline cable, such as the example shown in FIG. 5. A typical wireline cable 36 will have an outer sheath 42, encasing outer armor wires 44, which are armored wires which are helically wrapped around the cable along its length, and inner armor wires 46, which are also helically wrapped armored wires, usually with a different helical pitch and/or winding sense. Inside the armored layers will typically by an inner electrically insulating layer 48, of a suitable thickness to electrically insulate against any high voltages being carried by lines in the centre of the wireline. Any operating lines, such as tool communication and control lines, will then be in the centre of the wireline. In this example we show the high reflectivity optical fiber 50 used in embodiments of the present disclosure, but typically other control, communication, or downhole tool powerlines will also be present.

Due to the extensive armoring and insulation, the wireline is heavier than any liquids that would typically be found downhole, and hence will sink to the bottom surface of any horizontal sections of casing or tubing into which it is deployed, or any sections with a horizontal component of direction, and maintain contact with the inner surface thereof.

Figure 4:
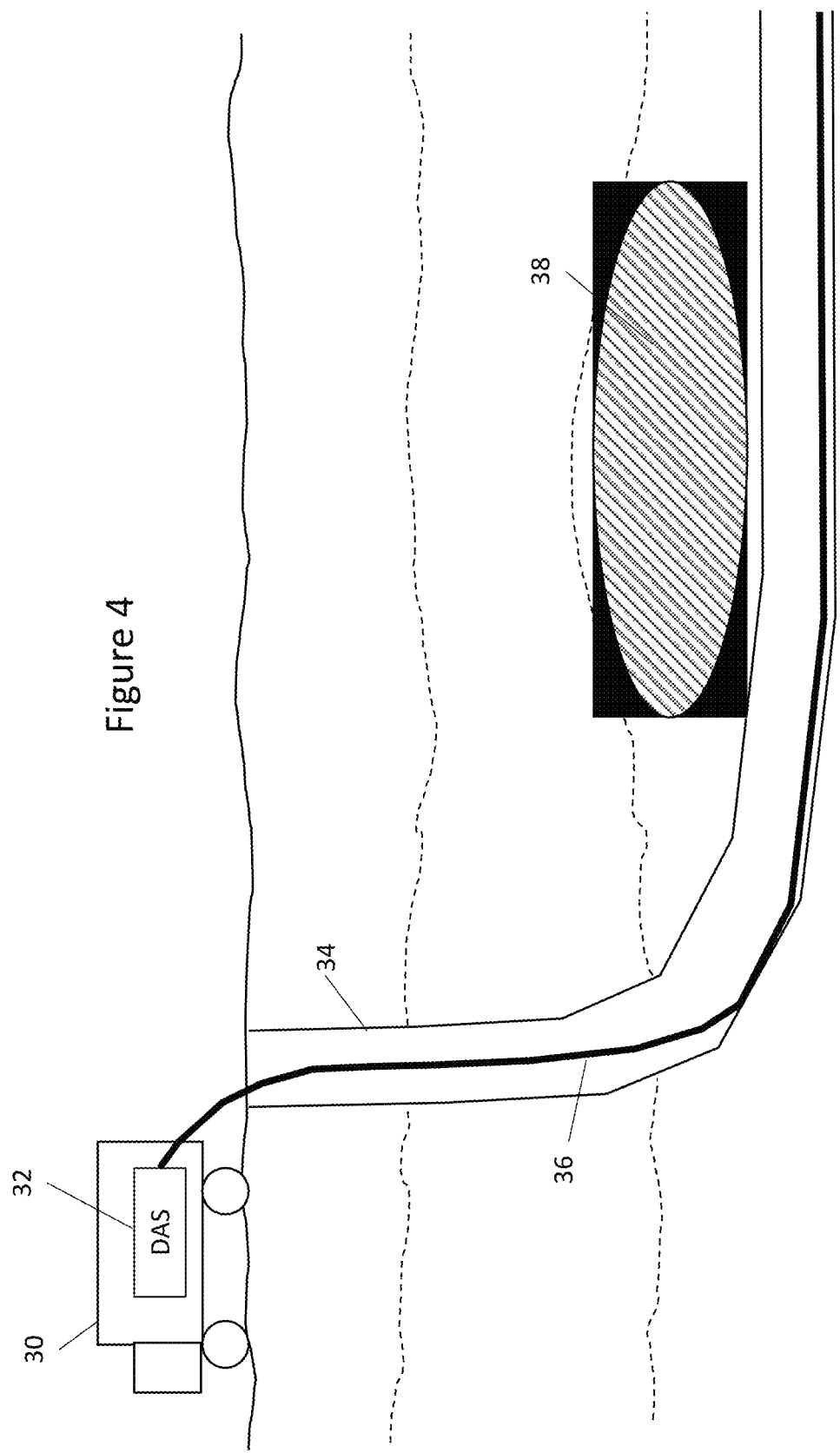
FIG. 4 is diagram illustrating the deployment of a wireline cable incorporating a high reflectivity optical fiber such as those shown in FIG. 1 or 3.

FIG. 4 shows the whole system in operation. Here an optical fiber distributed acoustic sensor system interrogator box, such as a Silixa® iDAS™ system 32 configured as described in WO2016/142695 is provided inside a wireline deployment truck 30. The wireline deployment truck 30 has conventional wireline deployment apparatus which is able to deploy the wireline 36 containing the high reflectivity cable 50 into the well 34, and specifically into the horizontal production zone 38 of the well. As will be seen, the cable sits at the bottom of the well tubing or casing, in contact therewith (the small gap shown is for illustration purposes only so it is clear which is the cable and which the casing or tubing). The optical fiber DAS system then operates as described in WO2016/142695 to detect high spatial resolution (typically ~<1 m) and high bandwidth (typically up to ~100 kHz) acoustic information from along the length of the production zone. In particular, any of microseismic, low frequency strain and drilling induced vibrations can be detected inside the wellbore using the wireline cable connected to the DAS.

Once all of the sensing that has been undertaken in the particular wellbore has been undertaken, then in common with known wireline sensor systems the wireline carrying the optical fiber cable can be retrieved from the wellbore, for deployment elsewhere. The cable would typically be disconnected from the DAS equipment, and wound back onto a cable reel, such that it can then be reused in the future in another wellbore.

In addition, and as noted previously, in another embodiment such a cable and DAS arrangement could be deployed into a drilled but uncompleted well whilst an adjacent well is being drilled and detect the variation in drilling induced vibrations that relate to differences in stress and brittleness of the formation along the long lateral section. In such a case the cable would then not lie inside the casing or tubing but instead inside the uncompleted well, but in other respects the details of the cable and the DAS system would remain the same as the earlier embodiment.

Co-Location of Microseismic Events

The high sensitivity wireline cable permits reservoir monitoring configurations that were previously prohibitively expensive. The installation of three or more permanently installed fiber optic cables for fracture monitoring would not have been considered as installing these cables requires additional downhole components, additional metal mass within the cable for example, to ensure the cable is not perforated during any fracking operations. The risk of loss of costly cables has been a barrier to the full DAS and DTS instrumentation of an unconventional reservoir.

Figure 6:
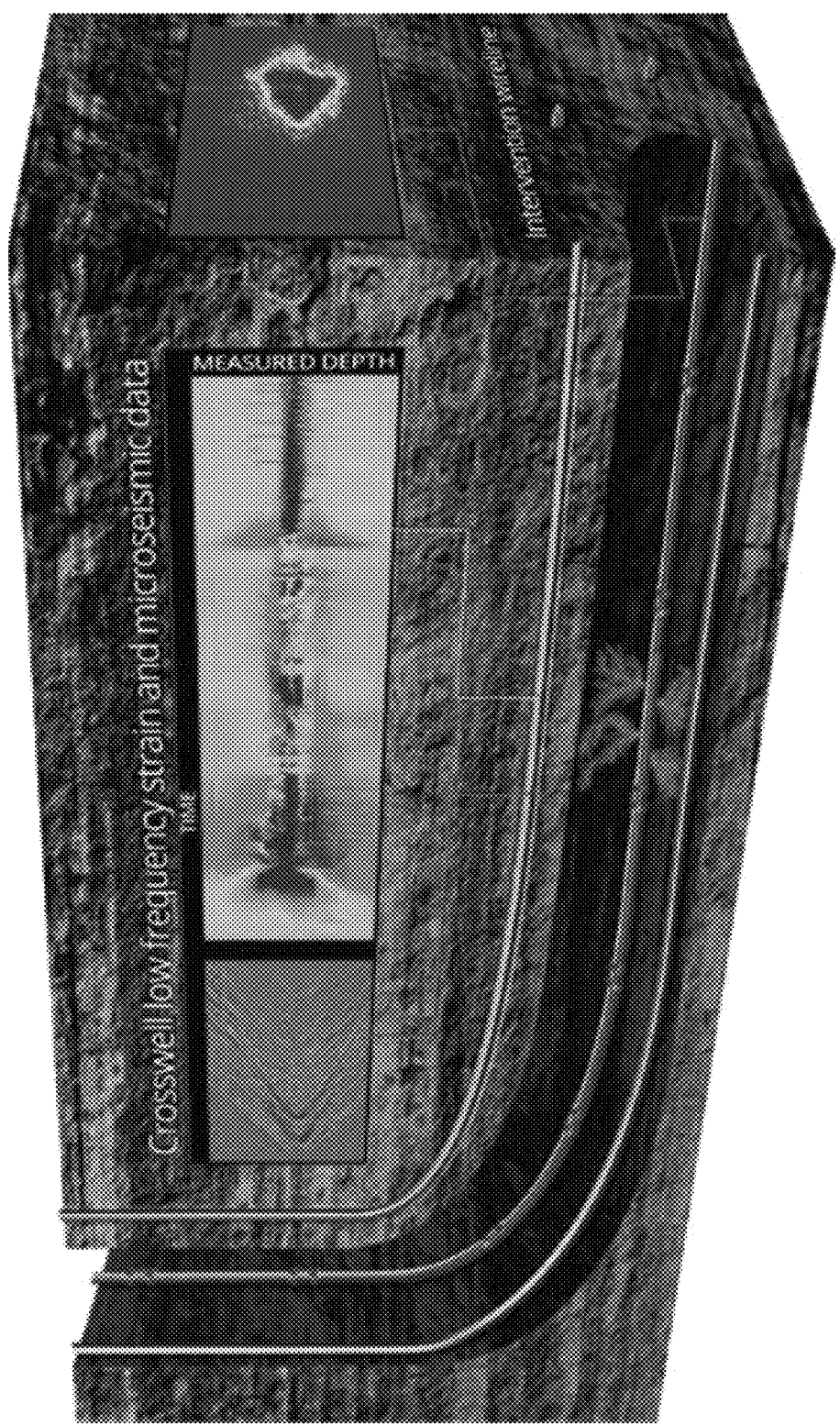
FIG. 6 is a picture showing how the cable described herein may be used in multiple wells in the same field.
Figure 7:
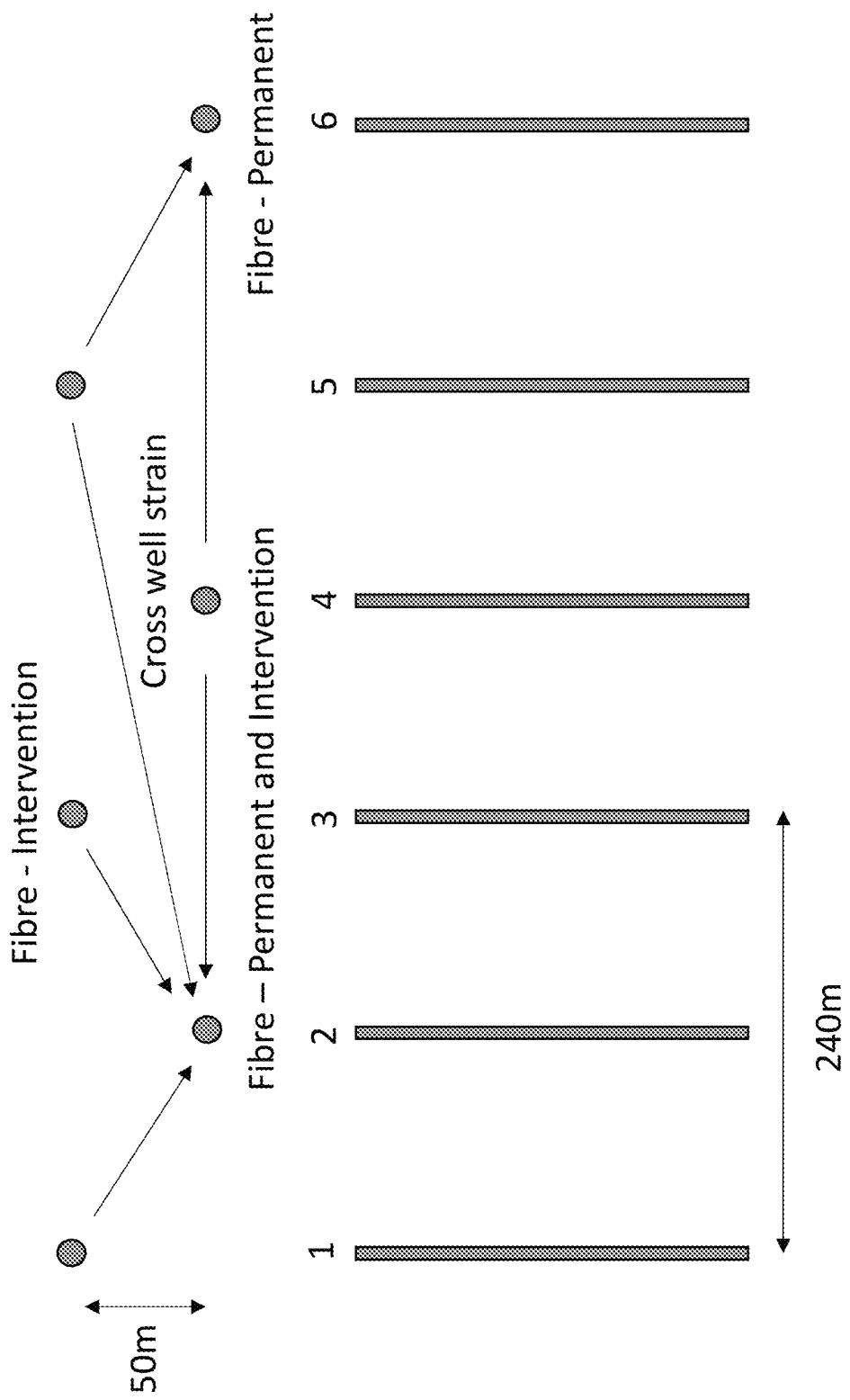
FIG. 7 is a diagram showing how cross well strain may be measured between multiple wells.

Using two or more high sensitivity wireline cables as described herein in conjunction with the usual permanently installed cable in an observation well allows the colocation of microseismic events, by the simultaneous monitoring of the depth and distance of each microseismic event, on each permanent or wireline cable. Once the events have been detected standard geophysical processing techniques can be used to map the events across the reservoir or zone of monitoring. FIGS. 6 and 7 show further details.

More particularly, as shown in FIGS. 6 and 7, where multiple wells are available within a particular field, then the intervention cable described herein can be used in conjunction with permanently installed cable in one or more of the wells to allow cross well strain to be measured, as described below, and also to allow co-location of microseismic events. In this respect, our earlier patent application WO2012/168679 describes how acoustic sources such as microseismic events may be detected and localised from a single DAS enabled optical fiber cable. By using the same techniques independently on multiple cables installed or inserted into different wells in the same field then increased accuracy can be obtained by cross-correlating and/or cross-referencing the results from the individual cables.

Crosswell Strain

Figure 8:
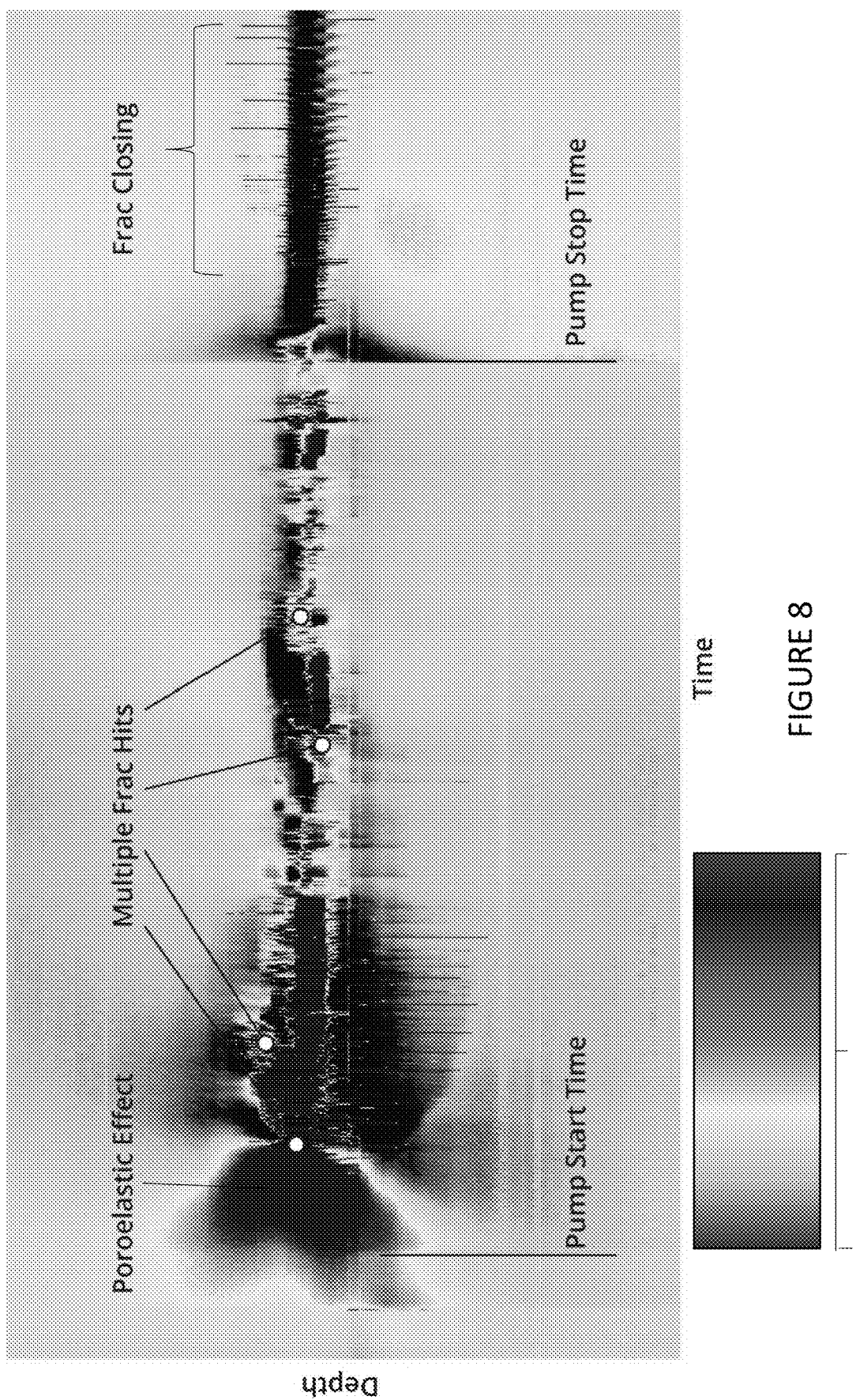
FIG. 8 is plot of acoustic energy measured at different depths along a well versus time, as measured by a DAS system described herein using the disclosed cable.

In addition to the ability to use multiple cables to locate and cross-reference microseismic events, because low frequency strain is measurable on the high sensitivity intervention cables described herein then the full fracture cycle can be monitored during fracking operations, including critical strain effects such as the the build up of tensional and compressional strain due to the poroelastic effects in the rock as fluid is pumped into the reservoir, followed by multiple frac events along the well, and the subsequent closing of fractures once pumping has ceased. FIG. 8 is a plot of acoustic energy from depth along the well (vertical axis)

against time (horizontal axis), with higher intensity acoustic energy shown in red through to orange colours, medium intensity acoustic energy in yellow through to green and then cyan (in order of decreasing energy), and then lower acoustic energy shown in cyan to blue colours (in decreasing energy levels). As will be seen from FIG. 8, the increased sensitivity available from the acoustic cables described herein when used with a DAS as described allows for the various phases of a fracking operation to be clearly seen. Specifically, when the fracking pump is first started and fracking fluid is first pumped into the well under hydraulic pressure, the hydraulic pressure in the well rises, and the poroelastic effect of the surrounding rock strata can be seen as it absorbs the increased pressure. Once the hydraulic pressure is such that the rock strata begin to fracture then multiple fracturing hits can be seen as the rock fractures along the well and acoustic energy is released with each fracture. When the fracking pump is stopped and the hydraulic pressure begins to subside, further acoustic energy is generated as the various fractures that were opened then close again, although as will be seen the acoustic energy of the fractures closing is less than the acoustic energy generated by the initial fractures generated when the pump is on.

Being able to actually see the formation of individual fractures in this manner, allows oil well engineers to measure or estimate the effectiveness of hydraulic fracturing operations more effectively.

Various modifications, whether by way of addition, deletion, or substitution may be made to above mentioned embodiments to provide further embodiments, any and all of which are intended to be encompassed by the appended claims.

What is claimed is:

1. A method of downhole acoustic surveying, the method comprising:
    deploying wireline or slickline cables downhole into multiple wells in the same field, each of said cables containing an optical fiber comprising at least one first sensing region having a plurality of reflector portions distributed along its length, and at least one of said cables comprising acoustically conducting armor surrounding the optical fiber, the armor being heavy enough such that when the cable lies in a horizontal section of well it lies under the force of gravity against the bottom of the well, and is thereby acoustically connected by the well and the acoustically conducting armor to the surrounding rock strata so as to be able to receive acoustic perturbations from the rock strata;
    connecting the surface ends of the optical fibers to respective distributed acoustic sensor interrogators;
    operating the distributed acoustic sensor interrogators simultaneously to send optical pulses along the optical fibers and measuring the optical reflections from said reflector portions of the fibers to thereby obtain distributed acoustic sensor data from multiple wells simultaneously, the distributed acoustic sensor data being indicative of a buildup of strain in the surrounding rock strata; and
    after operating the distributed acoustic sensor interrogators, disconnecting the surface end of at least one of the optical fibers from the respective interrogator and retrieving the respective cable from within the respective well.

2. A method according to claim 1, wherein said strain is low frequency strain.

3. A method according to claim 1, wherein said buildup of strain occurs prior to one or more fracturing events.

4. A method according to claim 1, and further comprising moving location to another well, and repeating the steps of the method at that other well.

5. A method according to claim 1, wherein operating the interrogators further comprises processing the measured optical reflections to measure the relative phase, frequency and amplitude of the received light from along the length of the optical fibers to detect acoustic perturbations.

6. A method according to claim 1, wherein at least one of the optical fibers in at least one of the wells is permanently deployed in the at least one well, and at least one of the other optical fibers deployed in another of the wells is retrievable from the another well.

7. A method according to claim 1, wherein at least one of said reflector portions comprises a plurality of fiber Bragg gratings.

8. A method according to claim 1, wherein said armor is heavy enough such that in use the cable sinks through any liquid in the horizontal section of well until it lies under the force of gravity against the bottom of the well.

9. A method according to claim 1, wherein at least one of said optical fibers further comprises at least one pulse transmission portion being a section of optical fiber in which no reflector portions are provided, the at least one pulse transmission portion being located between the respective distributed acoustic sensor interrogator and the at least one first sensing region, and configured in use to transport the optical signal pulses from the respective distributed acoustic sensor interrogator to the at least one first sensing region having the reflector portions.

10. A method according to claim 9, wherein a plurality of separate first sensing regions are provided each having reflector portions formed therein, connected in series by transmission portions of fiber where no reflector portions are formed.

11. A method according to claim 1, wherein said armor comprises at least one plurality of armor wires.

12. A method according to claim 11, wherein said at least one plurality of armor wires comprises a plurality of inner armor wires surrounding the optical fiber and a plurality of outer armor wires surrounding the inner armor wires.

13. A method according to claim 12, wherein said inner armor wires and said outer armor wires are helical in shape, and
    wherein said inner armor wires have a different helical pitch from said outer armor wires and/or said inner armor wires have a different winding sense from said outer armor wires.

14. A method according to claim 1, and further comprising processing the optical reflections to determine properties of any acoustic signals incident on at least one of the cables along its length.

15. A method according to claim 14, and further comprising processing the determined properties of any acoustic signals to determine properties of any microseismic and/or drilling induced vibrations present in the vicinity of the well(s).

16. A method according to claim 14, and further comprising processing the determined properties of any acoustic signals to determine any one or more of:
    i) a poroelastic effect within the surrounding rock strata;
    ii) a hydraulic fracturing pump start and/or stop time;
    iii) rock fractures opening around or in the well(s) during hydraulic fracturing operations;
    iv) rock fractures closing around or in the well(s) after hydraulic fracturing operations have ceased.

17. A method of downhole acoustic surveying, the method comprising:
- deploying wireline or slickline cables downhole into multiple wells in the same field, each of said cables containing an optical fiber comprising at least one first sensing region having a plurality of reflector portions distributed along its length, and at least one of said cables comprising acoustically conducting armor surrounding the optical fiber, the armor being heavy enough such that when the cable lies in a horizontal section of well it lies under the force of gravity against the bottom of the well, and is thereby acoustically connected by the well and the acoustically conducting armor to the surrounding rock strata so as to be able to receive acoustic perturbations from the rock strata;
- connecting the surface ends of the optical fibers to respective distributed acoustic sensor interrogators;
- operating the distributed acoustic sensor interrogators simultaneously to send optical pulses along the optical fibers and measuring the optical reflections from said reflector portions of the fibers to thereby obtain distributed acoustic sensor data from multiple wells simultaneously, the distributed acoustic sensor data being indicative of low frequency strain in the surrounding rock strata; and
- after operating the distributed acoustic sensor interrogators, disconnecting the surface end of at least one of the optical fibers from the respective interrogator and retrieving the respective cable from within the respective well.

18. A method of downhole acoustic surveying, the method comprising:
- deploying wireline or slickline cables downhole into multiple wells in the same field, each of said cables containing an optical fiber comprising at least one first sensing region having a plurality of reflector portions distributed along its length, and at least one of said cables comprising acoustically conducting armor surrounding the optical fiber, the armor being heavy enough such that when the cable lies in a horizontal section of well it lies under the force of gravity against the bottom of the well, and is thereby acoustically connected by the well and the acoustically conducting armor to the surrounding rock strata so as to be able to receive acoustic perturbations from the rock strata;
- connecting the surface ends of the optical fibers to respective distributed acoustic sensor interrogators;
- operating the distributed acoustic sensor interrogators simultaneously to send optical pulses along the optical fibers and measuring the optical reflections from said reflector portions of the fibers to thereby obtain distributed acoustic sensor data from multiple wells simultaneously, the distributed acoustic sensor data being indicative of strain generated prior to one or more fracturing events; and
- after operating the distributed acoustic sensor interrogators, disconnecting the surface end of at least one of the optical fibers from the respective interrogator and retrieving the respective cable from within the respective well.

* * * * *